(12) United States Patent
Grey et al.

(10) Patent No.: US 12,155,196 B2
(45) Date of Patent: *Nov. 26, 2024

(54) METROLOGY DEVICE INCLUDING A HIGH-VOLTAGE PROTECTION MODULE

(71) Applicant: Itron, Inc., Liberty Lake, WA (US)

(72) Inventors: Steven Alexander Grey, Walhalla, SC (US); Dipankar L. Tewari, Seneca, SC (US); Jaihind Reddy Maddi, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,694

(22) Filed: Sep. 13, 2023

(65) Prior Publication Data

US 2024/0006871 A1 Jan. 4, 2024

Related U.S. Application Data

(63) Continuation of application No. 17/114,215, filed on Dec. 7, 2020, now Pat. No. 11,764,567.

(60) Provisional application No. 63/071,873, filed on Aug. 28, 2020.

(51) Int. Cl.
*H02H 3/22* (2006.01)
*G01D 4/02* (2006.01)

(52) U.S. Cl.
CPC .............. *H02H 3/22* (2013.01); *G01D 4/02* (2013.01)

(58) Field of Classification Search
CPC ........ G01D 4/002; G01D 4/004; G01D 4/006; G01D 4/02; H02H 3/04; H02H 3/044; H02H 3/046; H02H 3/22; H02H 9/04; H02H 9/041; H02H 9/042; H02H 9/06
See application file for complete search history.

(56) References Cited

U.S. PATENT DOCUMENTS

| 4,439,807 A | 3/1984 | Reitz |
| 4,639,818 A * | 1/1987 | Cherian ................. H01C 1/022 219/505 |

(Continued)

FOREIGN PATENT DOCUMENTS

| CN | 101079343 | 11/2007 |
| CN | 201876480 U * | 6/2011 |

(Continued)

OTHER PUBLICATIONS

Office Action for U.S. Appl. No. 17/114,215, mailed on Jan. 5, 2023, Grey, "Metrology Device Including a High-Voltage Protection Module", 12 pages.

(Continued)

*Primary Examiner* — Jared Fureman
*Assistant Examiner* — Nicolas Bellido
(74) *Attorney, Agent, or Firm* — Lee & Hayes, P.C.

(57) ABSTRACT

A high-voltage protection module for a metrology device includes a metal-oxide varistor (MOV) coupled across a mains power line, a resistor electrically coupled to the MOV in series with the MOV, and a fuse electrically coupled to the MOV and the resistor in series, the resistor being located between the fuse and the MOV. The fuse opens upon an overvoltage event disengaging alternating current (AC) power from the mains power line to the metrology device.

18 Claims, 7 Drawing Sheets

(56) References Cited

U.S. PATENT DOCUMENTS

| | | | | |
|---|---|---|---|---|
| 4,803,632 | A | * | 2/1989 | Frew .................... G01R 22/065 |
| | | | | 340/12.32 |
| 5,994,892 | A | * | 11/1999 | Turino .................. G01R 22/00 |
| | | | | 324/142 |
| 6,040,971 | A | * | 3/2000 | Martenson ............... H01C 7/12 |
| | | | | 361/103 |
| 7,616,420 | B2 | * | 11/2009 | Slater .................... H02H 9/042 |
| | | | | 361/103 |
| 11,764,567 | B2 | * | 9/2023 | Grey ........................ H02H 3/22 |
| | | | | 361/91.1 |
| 2002/0080545 | A1 | | 6/2002 | Slater et al. |
| 2008/0088405 | A1 | | 4/2008 | Xu |
| 2008/0117077 | A1 | | 5/2008 | Ratiu et al. |
| 2015/0333499 | A1 | | 11/2015 | Oppenheimer et al. |
| 2016/0370204 | A1 | | 12/2016 | Spanier et al. |
| 2022/0065905 | A1 | | 3/2022 | Lancaster et al. |
| 2022/0069564 | A1 | | 3/2022 | Grey et al. |
| 2022/0071033 | A1 | | 3/2022 | Nelson, III |

FOREIGN PATENT DOCUMENTS

| | | |
|---|---|---|
| CN | 206117147 U | 4/2017 |
| KR | 20170001929 | 11/2015 |
| WO | WO2007079656 | 7/2007 |

OTHER PUBLICATIONS

Office Action for U.S. Appl. No. 17/114,215, mailed Jun. 22, 2022, Grey, "Metrology Device Including a High-Voltage Protection Module", 11 pages.

PCT Invitation to Pay Additional Fees for PCT Application No. PCT/US21/36452, dtd Sep. 23, 2021.

Search Report and Written Opinion for PCT Application No. PCT/US21/36452, mailed Nov. 15, 2021, 18 pages.

Office Action for Canadian Application No. 3,185,925, Dated Jul. 29, 2024, 5 pages.

* cited by examiner

METROLOGY DEVICE INCLUDING A HIGH-VOLTAGE PROTECTION MODULE

RELATED MATTERS

This application is a continuation of and claims priority to U.S. patent application Ser. No. 17/114,215, filed Dec. 7, 2020, titled "Metrology Device Including a High-Voltage Protection Module," which claims priority to U.S. Provisional Patent Application No. 63/071,873, filed Aug. 28, 2020, the entirety of all of which are incorporated herein by reference.

TECHNICAL FIELD

The present disclosure relates generally to utility meters. Specifically, the present disclosure relates to high-voltage protection systems and methods of a metrology device.

BACKGROUND

Utility metering units such as electric, water and gas meters are devices that measure the amount of the utility such as electricity, water, and gas consumed by a residence, a commercial building, or an electrically powered device. During the lifetime of a utility metering unit, the utility metering unit may be exposed to a myriad of environmental events and/or conditions that may impair or otherwise adversely affect the performance and functionality of the utility metering unit. Further, these environmental conditions may diminish the on-field longevity of the utility metering unit. Thus, the environmental conditions may result in higher costs to a utility provider and/or a utility consumer.

Still further, because the utility metering unit may be installed at a location outside a building such as a residential house or a commercial building, the utility metering units may not be electrically coupled to the building's internal breaker systems. This can result in the utility metering unit being at risk of being subjected to high voltage and environmental surges directly connected to the power grid to which the utility metering unit and the building's internal breaker systems are electrically coupled. This poses a significant risk to the utility metering unit, the building, and individuals in and around the building.

The environmental events and/or conditions the utility metering unit may be subjected to during field deployments may include a transient high voltage (HV) surge event including impulse and ringing waveforms. The cause of an HV surge event may include, for example, lightning, power line arching, or other high voltage instances. In another example, the environmental events and/or conditions the utility metering unit may be subjected to during field deployments may include abnormal overload conditions caused by end-of-life (EOL) and/or aging of on-board components such as metal-oxide varistors (MOVs) and other circuit protection devices. Further, in another example, the environmental events and/or conditions the utility metering unit may be subjected to during field deployments may include abnormal overvoltage conditions. The abnormal overvoltage conditions may be caused by, for example, power-grid voltage stability issues due to fluctuations in demand, among other causes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
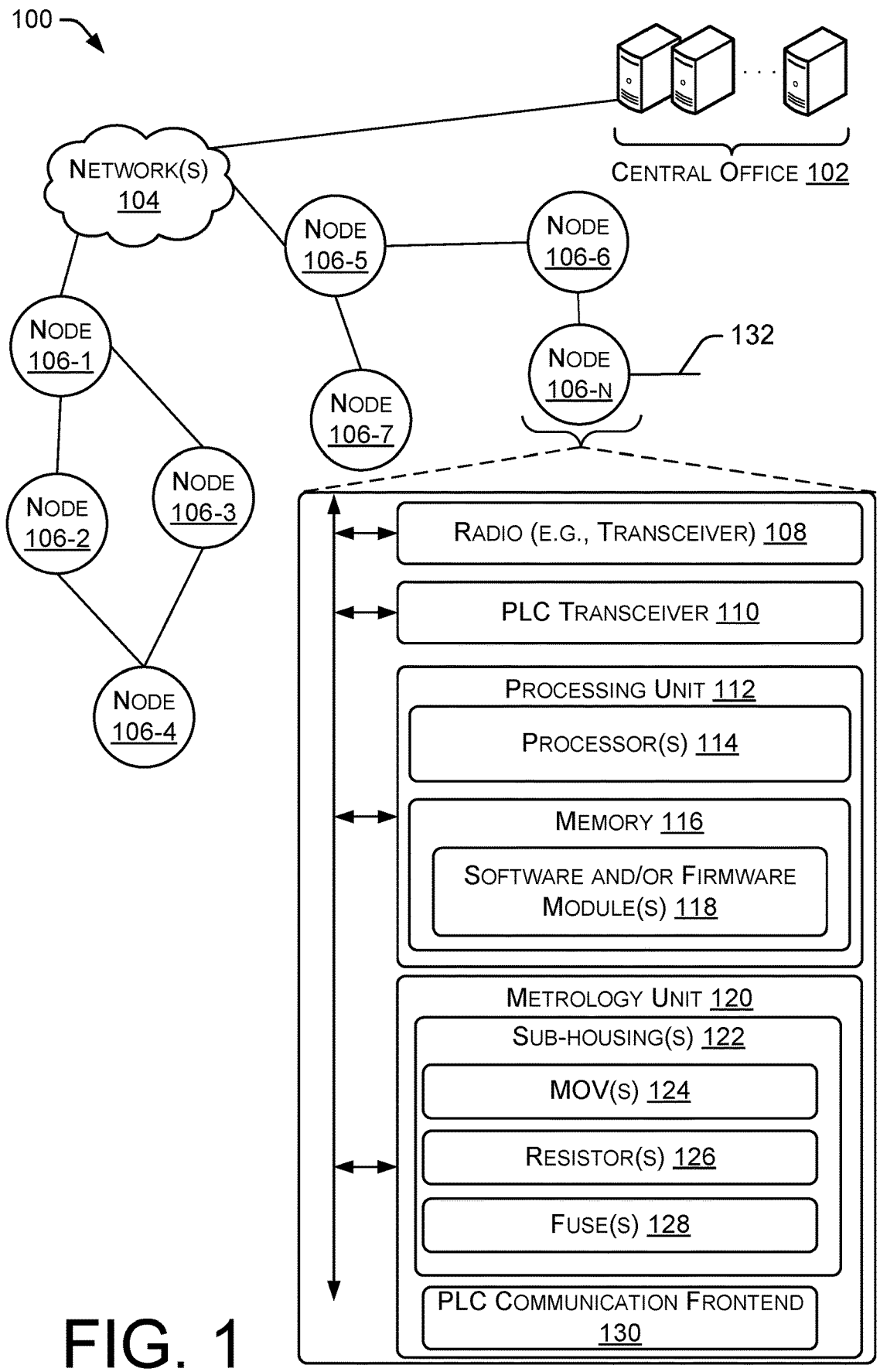
FIG. 1 is a diagram showing a high-level view of a network including nodes configured with a high-voltage protection module, according to an example of the principles described herein.

As mentioned above, a utility metering unit (also referred to herein as a "utility meter" or a "metrology device") may be subjected to high voltage (HV) surge events and abnormal overload conditions that negatively affect the functioning and/or lifespan of the utility meter. In some instances, the utility meter may utilize power line communication (PLC) technologies to communicate with one or more of neighbor utility meters (also referred to herein as "nodes") over PLC communication links within a network of utility meters. PLC communications technologies utilize a low ohmic connection to the mains terminals of the utility meters. Failure to include a PLC compatible connection can reduce communication performance and result in an inability to transfer data from the utility meters to a central office. Low ohmic connections utilize line-to-line voltage clamping to protect PLC front end communication devices from HV surge events and abnormal overload conditions, among other types of surge and transient events. These components that are connected line-to-line have failure modes that fail short. When a protection device fails short with no current limiting impedance, the utility meter enclosure including any and all components and devices of the utility meter are at risk of complete failure. Such a complete failure results in the loss of the entirety of the utility meter. This complete loss results in a relatively larger cost in replacement versus the replacement of failure components within the utility meter.

The failure components that serve as protection mechanisms that assist in avoiding a complete loss of the utility meter include metal-oxide varistors (MOVs) and other similar circuit protection devices. An MOV within a utility meter may be placed directly across the mains line in order to reduce clamping voltage (e.g., a let-through voltage). The clamping voltage defines what spike voltage may cause the protective components such as the MOV to short or "clamp." A relatively lower clamping voltage may provide relatively better protection but may result in a shorter life expectancy for the overall protective system. The lowest three levels of protection defined in the Underwriters Laboratories (UL) rating are 330 V, 400 V and 600 V, for example. A standard let-through voltage for 120 V AC devices may be, for example, 330 volts.

In a first approach, a protection circuit including an MOV within a utility meter may be designed such that energy into the MOV is limited. This first approach assumes the MOV will short (e.g., fail) during its lifetime. This approach may result in increased costs of replacing the MOV itself as well as downtime for the utility meter and time spent by a service technician to replace the MOV.

A second approach may include designing the MOV itself such that it will not short (e.g., fail) in the first instance throughout the life of the utility meter. This second approach includes an MOV that is over-spec'd to increase the robustness of the MOV. However, some regulatory and product safety organizations (e.g., the National Electrical Manufacturers Association (NEMA)) have determined that a wear out mechanism within the MOV will result in even a relatively more robust MOV ultimately shorting or failing. Further, an MOV located directly across an electrical line may be considered by the regulatory and product safety organizations as a design point that may not be tolerated. For example, NEMA standard C12.30-2019 defines some of these standards.

Thus, the present systems and methods seek to address these issues based on the first approach described above. The systems and methods described herein include a fuse to protect from overvoltage situations that may cause the protection device to fail short. A series limiting resistor is included within the circuit associated with the MOV to allow the fuse to break currents with service voltages that would normally exceed the rating of the fuse.

Inclusion of a series limiting resistor in front of a fuse may not be necessary in some scenarios since most applications utilize an entirely low ohmic connection for efficiency or power demand. Communication modules do not draw significant amounts of power so the communication modules can tolerate some level of impedance. Further, selection of the components to ensure compliance in a metering environment may take into consideration that a specific resistor or fuse function within the protection circuit described herein is selected in order to control the failure chain.

Still further, in instances where the utility meter fails, the outgassing of various electrical components may occur. The outgassing of an electrical component may occur because of an HV surge event or abnormal overload condition where the physical and chemical properties of the electrical components including, for example, an MOV, are compromised. This may lead to the outgassing of the electrical component where the various gasses present in the packaging of the electrical component overcome external packaging and allow for chemicals to escape the packaging. For example, an MOV may contain a ceramic mass of zinc oxide grains, in a matrix of other metal oxides, such as small amounts of bismuth, cobalt, manganese oxides. These elements are sandwiched between two metal plates which constitute the electrodes of the MOV. The boundary between each grain and a neighbor forms a diode junction, which allows current to flow in only one direction. The accumulation of randomly oriented grains is electrically equivalent to a network of back-to-back diode pairs, each pair in parallel with many other pairs. When a relatively small voltage is applied across the electrodes of the MOV, a relatively smaller current flows caused by reverse leakage through the diode junctions. In contrast, when a relatively larger voltage is applied, the diode junction breaks down due to a combination of thermionic emission and electron tunneling, resulting in a relatively larger current flow.

The result of this behavior is a nonlinear current-voltage characteristic, in which the MOV has a high resistance at low voltages and a low resistance at high voltages. However, in an HV surge event or abnormal overload condition (e.g., an overvoltage condition) above a voltage range that the MOV may physically tolerate without damage, the ceramic mass of zinc oxide grains in the matrix of other metal oxides may heat up, chemically react, sublimate, evaporate, and/or otherwise degrade to the point where the chemicals are catastrophically ejected from the packaging of the MOV. Throughout the description, this damage to the MOV and subsequent ejection of material may be referred to as "chemical ejection." These ejected chemicals may cause damage to other electrical devices within the utility meter. In some instances, the ejected chemicals may include ionized plasma that may damage surrounding components of the utility meter through electrical shorting. Further, the ionized plasma may even cause portions of the utility meter to heat up and burn, which may, in turn, result in fire damage to the utility meter and/or the structure to which the utility meter is coupled. Thus, in the examples described herein, mechanical structures may be included in the utility meter surrounding the MOV and/or other devices to provide for venting of the chemical ejection to occur into a region of the utility meter that does not include high voltage clearances and away from portions of the utility meter that include flammable materials.

In the examples described herein, the high-voltage protection module (e.g., circuitry) and the mechanical structures allow for the utility meter to fail gracefully under HV surge events and abnormal overload conditions such as a sustained overvoltage condition that may occur on the power grid. To fail gracefully may include the containment of any electrical short, outgassing, chemical ejections, etc., without damaging a remaining portion of the utility meter and its electrical and mechanical components and/or the structure to which the utility meter is coupled.

Overview

In the examples described herein, high-voltage protection module for a metrology device is provided to allow the metrology device fails gracefully in the event of an abnormal overvoltage or overcurrent scenario faced during on-field deployment. With a protection circuit, an MOV provides for a clamping voltage that serves to protect the metrology device and its various electrical components from damage by clamping any incoming HV surge or other abnormal overload condition. Further, a fuse and a resistor allow for interruption of sustained overload and/or overvoltage instances while providing effective current through which PLC communications may be possible via a PLC communications frontend and a PLC transceiver. Still further, a first sub-housing provides for containment and control of chemical ejections from the MOV, and thus, prevent the node (e.g., metrology device) from catastrophic failure.

Examples described herein provide a high-voltage protection module for a metrology device including a metal-oxide varistor (MOV) coupled across a mains power line, a resistor electrically coupled to the MOV in series and in front of the MOV, and a fuse electrically coupled to the MOV and the resistor in series, the resistor being located between the fuse and the MOV. The fuse opens upon an overvoltage event disengaging alternating current (AC) power from the mains power line to the metrology device.

The high-voltage protection module further includes a first housing, the first housing enclosing the MOV. The first housing includes a base portion to enclose a first portion of the MOV, and a top portion to enclose a second portion of the MOV, the top portion having an aperture defined therein to vent outgassing. The aperture defined in the top portion is defined in the top portion opposite a first side of the first housing relative to at least one component of the metrology device. The aperture includes a first aperture defined in the top portion, the first aperture venting to a first side of the top portion, and a second aperture defined in the top portion. The second aperture vents to a second side of the top portion opposite the first side.

The high-voltage protection module further includes a second housing. The second housing encloses the fuse and the resistor. The second housing is located on a second side opposite the first side. In one example, the MOV includes a first MOV coupled to the resistor and the fuse in series, and a second MOV coupled to the resistor and the fuse in series.

The high-voltage protection module further includes a power line carrier (PLC) communication frontend electrically coupled in series with the fuse and the resistor in series and in parallel with the MOV. The PLC communication frontend couples the mains power line to a PLC transceiver. The PLC communication frontend includes a capacitor in series with the fuse and the resistor, and a diode to provide clamp protection for the PLC transceiver.

Examples described herein also provide a metrology device including a power line carrier (PLC) transceiver, and a high-voltage protection module. The high-voltage protection module includes a metal-oxide varistor (MOV) coupled over a mains power line, a resistor electrically coupled to the MOV in series, and a fuse electrically coupled to the MOV and the resistor in series. The fuse opens upon an overvoltage event disengaging alternating current (AC) power from the mains power line to the metrology device.

The high-voltage protection module further includes a first housing, the first housing enclosing the MOV. The first housing includes a base portion to enclose a first portion of the MOV, and a top portion to enclose a second portion of the MOV, the top portion having an aperture defined therein to vent outgassing. The aperture defined in the top portion is defined in the top portion opposite a first side of the first housing relative to at least one component of the metrology device.

The high-voltage protection module further comprises a second housing. The second housing encloses the fuse and the resistor. The second housing is located on a second side opposite the first side.

The high-voltage protection module further includes a PLC communication frontend electrically coupled in series with the fuse and the resistor in series and in parallel with the MOV. The PLC communication frontend couples the mains power line to a PLC transceiver. The PLC communication frontend includes a capacitor in series with the fuse and the resistor, and a diode to provide clamp protection for the PLC transceiver.

In one example, the MOV includes a first MOV coupled to the resistor and the fuse in series and a second MOV coupled to the resistor and the fuse in series. The aperture includes a first aperture defined in the top portion, the first aperture venting to a first side of the top portion, and a second aperture defined in the top portion, the second aperture venting to a second side of the top portion opposite the first side.

Examples described herein also provide a network including a metrology device communicatively coupled within the network, and a central office communicatively coupled to the metrology device at least in part over a power line. The metrology device includes a metrology unit. The metrology unit includes a high-voltage protection module including a metal-oxide varistor (MOV) coupled over a mains power line, a resistor electrically coupled to the MOV in series, and a fuse electrically coupled to the MOV and the resistor in series. The fuse opens upon an overvoltage event disengaging alternating current (AC) power from the mains power line to the metrology device.

The metrology device further includes a power line carrier (PLC) transceiver, and a PLC communication frontend electrically coupled in series with the fuse and the resistor in series and electrically coupled in parallel with the MOV. The PLC communication frontend couples the mains power line to the PLC transceiver.

The high-voltage protection module further includes a first housing, the first housing enclosing the MOV. The first housing includes a base portion to enclose a first portion of the MOV, and a top portion to enclose a second portion of the MOV, the top portion having an aperture defined therein to vent outgassing. The aperture defined in the top portion is defined in the top portion opposite a first side of the first housing relative to at least one component of the metrology device. The high-voltage protection module further includes a second housing. The second housing encloses the fuse and the resistor. The second housing is located on a second side opposite the first side.

The PLC communication frontend includes a capacitor in series with the fuse and the resistor, and a diode to provide clamp protection for the PLC transceiver. The MOV includes a first MOV coupled to the resistor and the fuse in series and a second MOV coupled to the resistor and the fuse in series.

The aperture includes a first aperture defined in the top portion. The first aperture vents to a third side of the top portion. The aperture includes a second aperture defined in the top portion. The second aperture vents to a fourth side of the top portion opposite the third side.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 is a diagram showing a high-level view of a network architecture 100 including nodes 106 configured with a high-voltage protection module, according to an example of the principles described herein. As used herein and in the appended claims, the high-voltage protection module includes electrical circuitry and/or mechanical structures that allow for the utility meter to fail gracefully under HV surge events and abnormal overload conditions such as a sustained overvoltage condition that may occur on the power grid. FIG. 1 also includes a component diagram of example components of a node 106 that includes the high-voltage protection module. The network architecture 100 includes a plurality of node(s) 106-1, 106-2, 106-3, 106-4, 106-5, 106-6, 106-7, . . . , 106-N, where N is any integer greater than or equal to 1 (collectively referred to herein as node(s) 106 unless specifically addressed otherwise). The nodes 106 are communicatively coupled to each other via direct communication paths or "links." In this example, N represents a number of nodes in an autonomous routing area (ARA), such as a wide area network (WAN), metropolitan area network (MAN), local area network (LAN), neighborhood area network (NAN), field area network (FAN), personal area network (PAN), among other types of networks. As an example, the nodes 106 may be configured in an RF mesh, a PLC mesh, or both. In one example, nodes 106 may be part of a low power and lossy network (LLN). The nodes 106 are or include utility meters used to measure an amount of the utility such as electricity, water, and gas consumed by a residence, a commercial building, or an electrically powered device.

As used in the present specification and in the appended claims, the term "link" is meant to be understood broadly as any direct communication path between two nodes (e.g., a "one hop" transmission that does not pass through or become propagated by another node). Each link may represent a plurality of channels or one or more variable data rate channels over which a node 106 is able to transmit or receive data. Each link may include multiple communication technologies, such as, for example, one or more PLC communication technologies.

One or more channels may use a power line communication (PLC) system communicated using a PLC communications technology. Thus, a link may include portions based on multiple communication medias including PLC portions. Likewise, various links may use multiple different PLC communications technologies (e.g., various modulation techniques, bandwidths, data rates, center frequencies, protocols, etc.).

The channels on a link may include a control channel and multiple data channels. In some instances, the control channel is utilized for communicating one or more messages between nodes to specify one of the data channels to be utilized to transfer data. In one example, transmissions on the control channel may be shorter relative to transmissions on the data channels. Once specified, the nodes may move to the data channel for communication.

Each of the nodes 106 may be implemented as, or associated with, any of a variety of computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, power line communication (PLC) transceivers, combinations of the foregoing, or any device couplable to a communication network and capable of sending and/or receiving data.

In this example, the nodes 106 may also be configured to communicate with one or more central processing facilities such as a central office 102 via an edge device (e.g., cellular relay, cellular router, edge router, destination oriented directed acyclic graph (DODAG) root, etc.) which serves as a connection point of the ARA to a backhaul network(s) 104, such as the Internet or one or more public or private intranets. In the illustrated example, node 106-1 and/or node 106-5 may serve as edge devices and/or cellular relays to relay communications from the other nodes 106-2 through 106-N of the ARA to and from the central office 102 via the network(s) 104.

As an example, node 106-N may be representative of each of the nodes 106 and includes a radio (e.g., a transceiver) 108, a PLC transceiver 110 and a processing unit 112. The radio 108 may include a radio frequency (RF) transceiver that may be configured to receive RF signals associated with multiple different RF communication technologies (e.g., FSK, OQPSK, OFDM, CDMA, etc.) at a variety of data rates, and transmit RF signals via one or more of a plurality of RF communication technologies. The radio 108 may include a multiple protocol receiver and may be configured to listen for a plurality of different RF communication technologies in a parallel fashion across multiple links. The radio 108 may also be configured to determine, or facilitate determination of, a received signal strength, such as a "received signal indicator" (RSI) for one or more of the plurality of different RF communication technologies.

In some implementations, each of the nodes 106 includes a single radio 108 configured to send and receive data on multiple different channels, such as the control channel and multiple data channels of each communication link. The radio 108 may also be configured to implement a plurality of different data rates, protocols, signal strengths, and/or power levels. The network architecture 100 may represent a heterogeneous network of nodes 106, in that the nodes 106 may include different types of nodes (e.g., smart meters, cellular relays, sensors, etc.), different generations or models of nodes, and/or nodes that otherwise are capable of transmitting on different channels and using different communication technologies, data rates, protocols, signal strengths, and/or power levels.

The power line communication (PLC) transceiver 110 is configured to transmit and/or receive one or more communication signals on electrical power wiring, including local power wiring and long distance high voltage transmission lines. The PLC transceiver 110 may transmit and/or receive different types of power line communications that include one or more PLC communication technologies (e.g., narrowband PLC, broadband PLC, power line digital subscriber line (PDSL), power line telecom (PLT), power line networking (PLN), broadband over power lines (BPL), etc.) having one or more frequency bands, channels, data rates and/or types of modulation that may depend on the propagation characteristics of the power wiring used.

The processing unit 112 is coupled to radio 108 and PLC transceiver 110, and may include one or more processor(s) 114 communicatively coupled to memory 116. The processor(s) 114 may include one or more cores. Further, the node 106-N may include one or more network interfaces configured to provide communications between the nodes 106, the central office 102, and other devices. The network interfaces may include devices configured to couple to personal area networks (PANs), wired and wireless local area networks (LANs), wired and wireless wide area networks (WANs), and so forth. For example, the network interfaces may include devices compatible with the nodes 106, the central office 102, and other devices.

The memory 116 may be configured to store one or more software and/or firmware modules, which are executable on the processor(s) 114 to implement various functions as described herein. While the modules 118 are described herein as being software and/or firmware executable on a processor, in other embodiments, any or all of the modules may be implemented in whole or in part by hardware (e.g., as an ASIC, a specialized processing unit, digital signal processor, etc.) to execute the described functions. The memory 116 may store various executable components (e.g., software-based components, firmware-based components, etc.) as the modules 118. In addition to various components discussed herein, the memory 116 may further store components to implement functionality described herein. While not illustrated, the memory 116 may store one or more operating systems utilized to control the operation of the one or more devices that include the node 106-N. According to one example, the operating system includes the LINUX operating system. According to another example, the operating system(s) include the WINDOWS SERVER operating system from MICROSOFT Corporation of Redmond, Washington. According to further examples, the operating system(s) may include the UNIX operating system or one of its variants. It may be appreciated that other operating systems may also be utilized.

The memory 116 may include computer-readable media and may take the form of volatile memory, such as random access memory (RAM) and/or non-volatile memory, such as read only memory (ROM) or flash RAM. Computer-readable media includes volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 104 may represent a backhaul network, which may itself include a wireless or a wired network, or a combination thereof. The network(s) 104 may be a collection of individual networks interconnected with each other and functioning as a single large network (e.g., the Internet and/or one or more intranets). Further, the individual networks may be wireless or wired networks, or a combination thereof.

The central office 102 may be implemented by one or more computing devices, such as servers, personal computers, laptop computers, etc. The one or more computing devices may be equipped with one or more processor(s) communicatively coupled to memory. In one example, the central office 102 includes a centralized meter data management system which performs processing, analysis, storage, and/or management of data received from one or more of the nodes 106. For example, the central office 102 may process, analyze, store, and/or manage data obtained from a smart utility meter, sensor, control device, router, regulator, server, relay, switch, valve, and/or other nodes. Although the example of FIG. 1 illustrates the central office 102 in a single location, in some examples the central office may be distributed amongst multiple locations and/or may be eliminated entirely (e.g., in the case of a highly decentralized distributed computing platform).

Electrical power may be measured by a metrology unit 120 associated with one or more of the nodes 106-N as the power is used by a consumer. In one example, power is delivered to a consumer from a transformer (not shown) by an electrical conductor 132. The quantity of power that is delivered is measured by the metrology unit 120 associated with node 106-N. The metrology unit 120 associated with node 106-N is able to detect, measure, interrupt, and protect the node 106-N from the power delivered over the conductor 132. The electrical power measured by the metrology unit 120 may be transmitted to the central office 102, and the central office 102 may be configured to include collection engine (CE) functionality. In one example, aspects of the CE functionality may be distributed, partly or fully, within some or all of the nodes 106. The central office 102 and its functionality may be centralized within a utility company, distributed among locations within the network 104, and/or located in a data center location or "cloud" environment.

The metrology unit 120 may be communicatively coupled to the radio 108, the PLC transceiver 110, and the procession unit 112, among other devices described herein in order to process and transmit detected electrical power measurements to other nodes 106 and/or the central office 102.

In the examples described herein, the metrology unit 120 may include a metal-oxide varistor(s) (MOVs) 124, resistor(s) 126, and fuse(s) 128. The MOV(s) 124, resistor(s) 126, and fuse(s) 128 may be housed in sub-housing(s) 122 as described herein to avoid catastrophic failure of the metrology unit 120 including other elements of the metrology unit 120 such as processing elements, circuitry, printed circuit boards (PCBs), etc. As described above, an HV surge event and/or an abnormal overload condition may cause circuitry elements including the MOV(s) 124, resistor(s) 126, and fuse(s) 128 to chemically react, sublimate, evaporate, and/or otherwise degrade to the point where the chemicals are catastrophically ejected from the packaging of the MOV(s) 124, resistor(s) 126, and/or fuse(s) 128. In order to allow the node 106-N and the metrology unit 120 to fail gracefully without damaging other elements of the node 106-N, the sub-housing(s) 122 may include apertures and other architectures that cause chemical ejection to be directed away from those elements within the metrology unit 120 and/or the node 106-N (e.g., the utility meter). The specific circuitry and sub-housing 122 architectures are described in more detail below.

The node 106-N may further include a PLC communication frontend 130. The PLC communication frontend 130 provides for communications to be sent via the architecture 100 of the network(s) 104 as a frontend device of the PLC transceiver 110. The PLC communication frontend 130 causes the PLC communication signals obtained via the PLC communication links between the nodes 106, the network 104, and the central office 102. The PLC communication frontend 130 is a sub-circuit within the high-voltage protection module that serves as an intermediary between the network of nodes 106 and the PLC transceiver 110.

The MOV(s) 124 include any varistor including, for example, a metal-oxide varistor as denoted by the acronym MOV. The MOV 124 within the utility meter (e.g., node 106-N) may be placed directly across the mains line in order to reduce clamping voltage (e.g., a let-through voltage). The clamping voltage defines what spike voltage may cause the protective components such as the MOV to short or "clamp." The MOV 124, therefore, is able to clamp any incoming HV surge or abnormal overload condition. A relatively lower clamping voltage provides relatively better protection but may result in a shorter life expectancy for the overall protective system. In a first approach, a circuit including an MOV within a utility meter may be designed such that energy into the MOV 124 is limited. This first approach assumes the MOV 124 will short (e.g., fail) during its lifetime. This approach may result in increased costs of replacing the MOV 124 itself as well as downtime for the utility meter and time spent by a service technician to replace the MOV 124. The second approach may include designing the MOV itself such that it will not short (e.g., fail) in the first instance throughout the life of the utility meter. This second approach includes an MOV 124 that is over-spec'd to increase the robustness of the MOV 124. However, as mentioned above, some regulatory and product safety organizations as well as consumers of metrology devices have determined that a wear out mechanism within the MOV 124 will result in even a relatively more robust MOV 124 ultimately shorting or failing.

Thus, the present systems and methods seek to address these issues based on the first approach. Further, as mentioned above, having the MOV 124 located directly across an electrical line may be considered by the regulatory and product safety organizations and consumers of metrology devices as a design point that may not be tolerated. As will be described in more detail below in connection with FIG. 2, a high-voltage protection module used to protect the metrology unit 120 from an HV surge event and/or an abnormal overload condition may also include the fuse(s) 128 and the resistor(s) 126 in series with the MOV 124 in order to protect from these overvoltage situations that would cause the MOV 124 to fail short. In one example, a series limiting resistor 126 is included within the circuit associated with the MOV 124 to allow the fuse 128 to break currents with service voltages that would normally exceed the rating of the fuse 128. In one example of a simulated overload and/or overvoltage condition that the protection circuit (FIG. 2, 200) may be exposed to may include an abnormal overvoltage scenario of, for example, a 3,000 VAC that rapidly diminishes the voltage clamping capability of the MOV 124. In this scenario, the fuse 128 is able to open in approximately 3.5 cycles and disengage the mains power to the node 106-N, and the PLC communication frontend 130. In this manner, the fuse 128 limits the exposure to an overload and/or overvoltage condition that may lead to the node 106-N (e.g., the utility meter) failing catastrophically.

Inclusion of a series limiting resistor 126 in front of the fuse 128 may not be necessary in most situations since most applications utilize entirely low ohmic connection for efficiency or power demand. Communication modules such as the PLC transceiver 110 and the associated PLC communication frontend 130 do not draw significant amounts of power, so these communication modules can tolerate some level of impedance. PLC communication devices such as the PLC transceiver 110 and the associated PLC communication frontend 130 require a direct connection to mains power, and because this direct connection to the mains power exists, the mains power must be protected. Further, because the components of the node 106-N require certain physical clearance reductions, the MOV 124 is located directly across an electrical line. Here, physical clearance may be defined as empty space along a plane such as a printed circuit board or other substrate on which electrical components are coupled. At the same time, if a fusible resistor (e.g., the resistor 126 and fuse 128 in series) is placed in front of the MOV 124 in order to protect the mains power, a sufficiently large resistor 126 may be required. However, placing such a large resistor 126 in front of the MOV 124 may cause the PLC communications abilities of the PLC transceiver 110 and the associated PLC communication frontend 130 to become severely attenuated or diminished. Thus, several constraints may be balanced including protecting the MOV 124 via the resistor 126 and fuse 128 in series with the MOV 124 in a condition in which it shorts or fails while providing a sufficiently effective PLC communication path for the PLC transceiver 110 and the associated PLC communication frontend 130.

Thus, in the examples described herein, a sufficiently robust MOV 124 is included in the high-voltage protection module of the metrology device (e.g., the node 106-N), including the fuse 128 in series with the MOV 124 in case the MOV 124 fails short (causing the fuse 128 to open). The fuse 128 by itself in series with the MOV 124, however, may not be able to break the current to the MOV 124 fast enough to prevent the MOV 124 from failing and expelling chemicals into the enclosure of the node 106-N unless the fuse 128 was a relatively fast-blow grade fuse. Such a relatively fast-blow grade fuse may not be sufficient to adhere to one or more product safety requirements related to surge withstand capability. In other words, use of a relatively fast-blow grade fuse may result in nuisance failures in the field where the node 106-N is located requiring an expensive and technical service and replacement process to replace the fuse 128 and increases the chance that a service technician may injure themselves while working on a high voltage system such as the node 106-N. Thus, the inclusion of the resistor 126 in series with and between the MOV 124 and the fuse 128 limits the current the fuse 128 would have to break in an HV surge event and/or an abnormal overload condition (the fuse rated at, for example, 10 kiloamps (kA)) as well as limits the voltage and allows the fuse 128 to break while still providing surge capabilities. Selection of the components to ensure compliance in a metering environment may be emphasized in order to take into consideration that a specific resistor 126 or fuse 128 function within the high-voltage protection module described herein in order to control the failure chain.

As described above, the high-voltage protection module including the fuse 128 and resistor 126 in series with the MOV 124 allows for the MOV 124 to be used across the electrical line, the resistor 126 allows for the use of a robust fuse 128, and the resistor 126 and fuse 128 allow for maintaining efficient PLC communication via the PLC transceiver 110 and the associated PLC communication frontend 130. However, the MOV 124 may still, in some instances, short or fail potentially resulting in chemical ejection. Thus, the sub-housing(s) 122 described herein provide a mechanical means of ensuring the chemical ejection is directed away from other elements of the node 106-N. The mechanical means used to direct chemical ejection away from the other elements of the node 106-N is described in connection with FIGS. 3 through 5.

Figure 2:
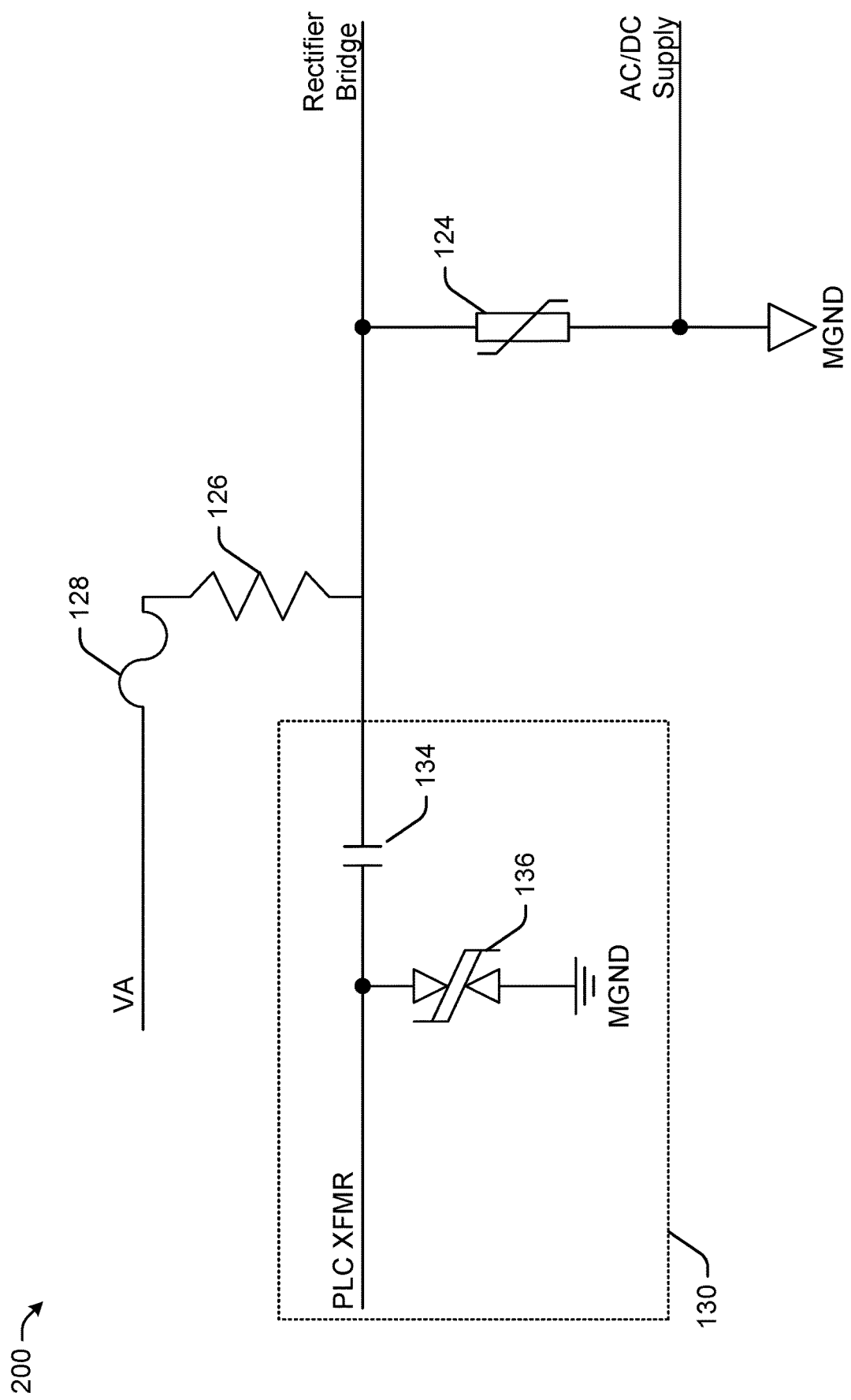
FIG. 2 illustrates a protection circuit of the high-voltage protection module of FIG. 1, according to an example of the principles described herein.

FIG. 2 illustrates a protection circuit 200 of the high-voltage protection module of FIG. 1, according to an example of the principles described herein. As mentioned above, the high-voltage protection module includes at least the MOV 124, the resistor 126, and the fuse 128 (along with the mechanical architecture described in connection with FIGS. 3 through 5). As depicted in FIG. 2, a mains power line enters the protection circuit 200 as indicated by VA. Current flows through the fuse 128 and the resistor 126 and branches into two separate directions to the MOV 124 and separately to the PLC communication frontend 130. As noted above, the current flowing through the fuse 128 and the resistor 126 provides for maintaining efficient PLC communication between the nodes 106, the network 104, and the central office 102. The fusible resistor (e.g., the fuse 128 in series with the resistor 126) is placed in front of the MOV 124 such that an HV surge event or other abnormal overload condition will cause the fusible resistor to open, and, in turn, protect the remainder of the circuit and the overall utility meter.

The PLC communication frontend 130 may include a capacitor 134 in series with the fuse 128 and resistor 126. The capacitor 134 may be, for example, a 0.22 microfarad (µF) capacitor. The PLC communication frontend 130 may also include a diode 136. The diode 136 may provide, for example, a 5V clamp protection to the PLC transceiver 110 to which the PLC communication frontend 130 is electrically coupled as indicated by the PLC transformer (e.g., "PLC XFMR"). In one example, PLC XFMR may include a transformer located on a register board of the PLC transceiver 110. The diode 136 is also electrically coupled to ground. Thus, the low-voltage signal provided to the PLC transceiver 110 via the PLC communication frontend 130 is protected primarily by the MOV 124 and secondarily by the diode 136. The diode 136 is also electrically coupled to ground. In one example, the diode 136 may include a transient voltage suppression (TVS) diode configured to protect the PLC transceiver 110 via the PLC communication frontend 130 from voltage spikes that may occur as described herein.

The current from the power grid also flows through the fuse 128 and the resistor 126 and on to the MOV 124. The MOV 124 may include any voltage-dependent resistor (VDR). MOVs may be specified according to the voltage range that they can tolerate without damage, the varistor's energy rating in joules, operating voltage, response time, maximum current, and breakdown (clamping) voltage. In one example, the MOV 124 may have a clamping voltage of 2.2 kilovolt (kV). The clamping voltage is the voltage the MOV 124 will limit the protection circuit 200 to when the MOV 124 sees an overload condition. Surge voltages up to the clamp voltage will be allowed, but the MOV 124 will begin to shunt current around the MOV 124 rating, progressively, up to the clamp voltage. At the clamp voltage, the resistance of the MOV 124 is as low as may be reasonable in a particular application. Stated another way, the clamp voltage represents a point at which the resistance of the MOV 124 is at a minimum such that any excess energy begins to be dumped progressively as more current is present. Further, current from the mains power may flow to other elements of the node 106 such as, for example, a rectifier bridge and an AC/DC supply as indicated in FIG. 2. The MOV 124 is also electrically coupled to ground.

As described above, the utility meter (e.g., node 106-N) is subjected to HV surges directly connected to the power grid. The MOV 124 assists in protecting the utility meter and its various electrical components from damage due to the HV surges by clamping any incoming HV surge or other abnormal overload condition. The MOV protects excessive transient voltages within the utility meter and shunts the current created by an excessive voltage away from sensitive components when triggered.

Figure 3:
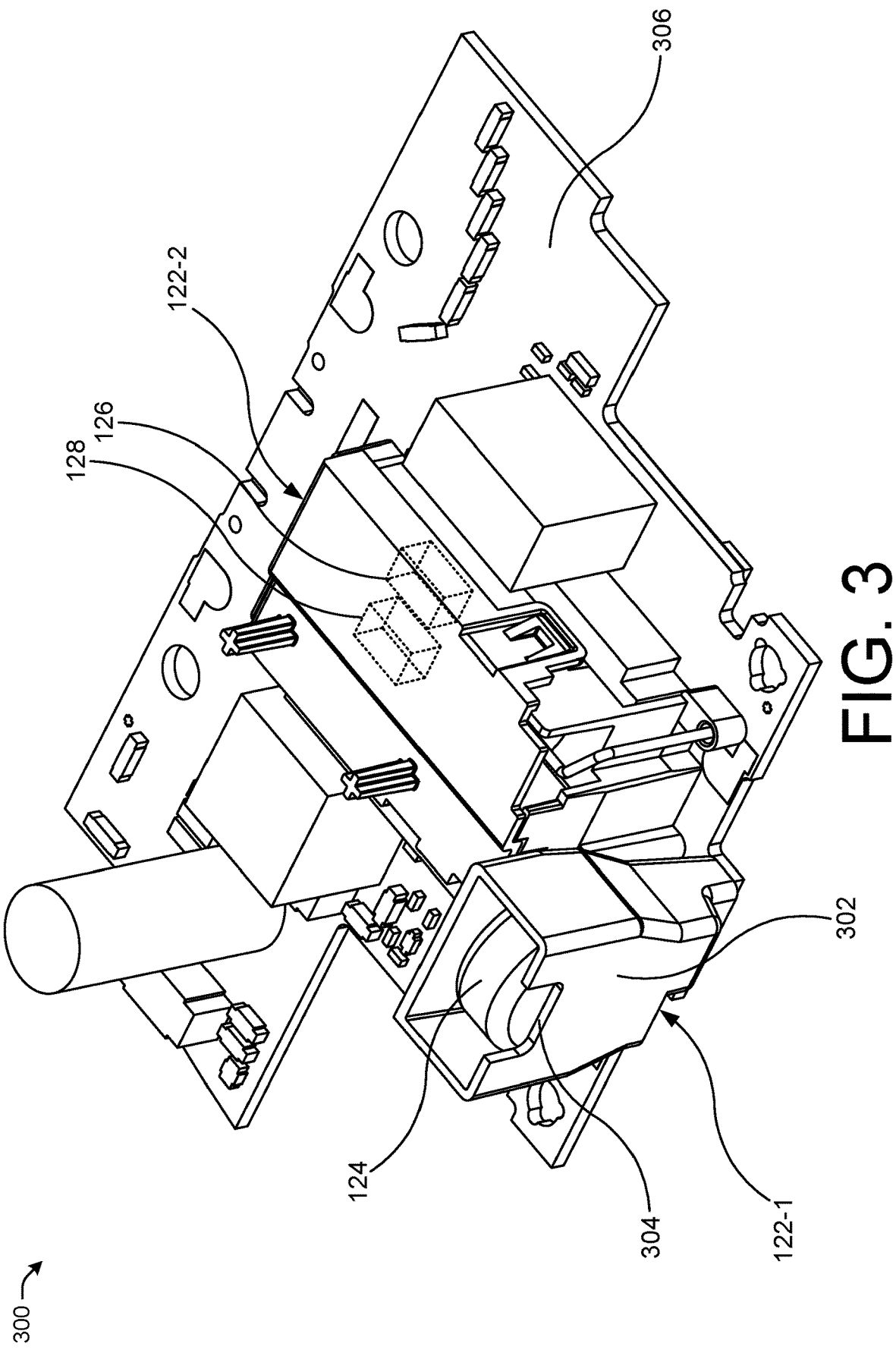
FIG. 3 illustrates a schematic diagram of the high-voltage protection module of FIG. 1, according to an example of the principles described herein.
Figure 4:
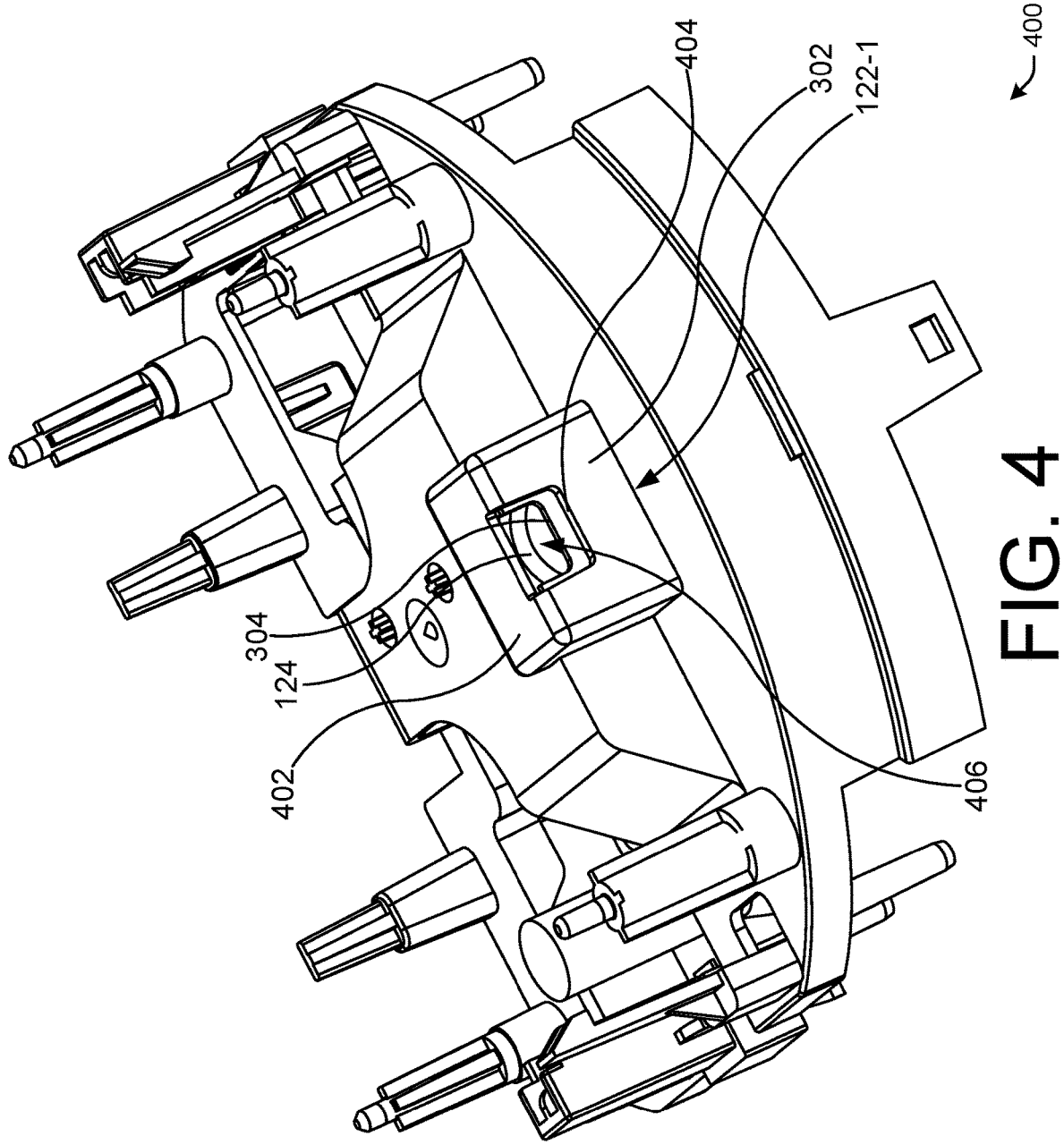
FIG. 4 illustrates a schematic diagram of the high-voltage protection module of FIG. 1, according to an example of the principles described herein.
Figure 5:
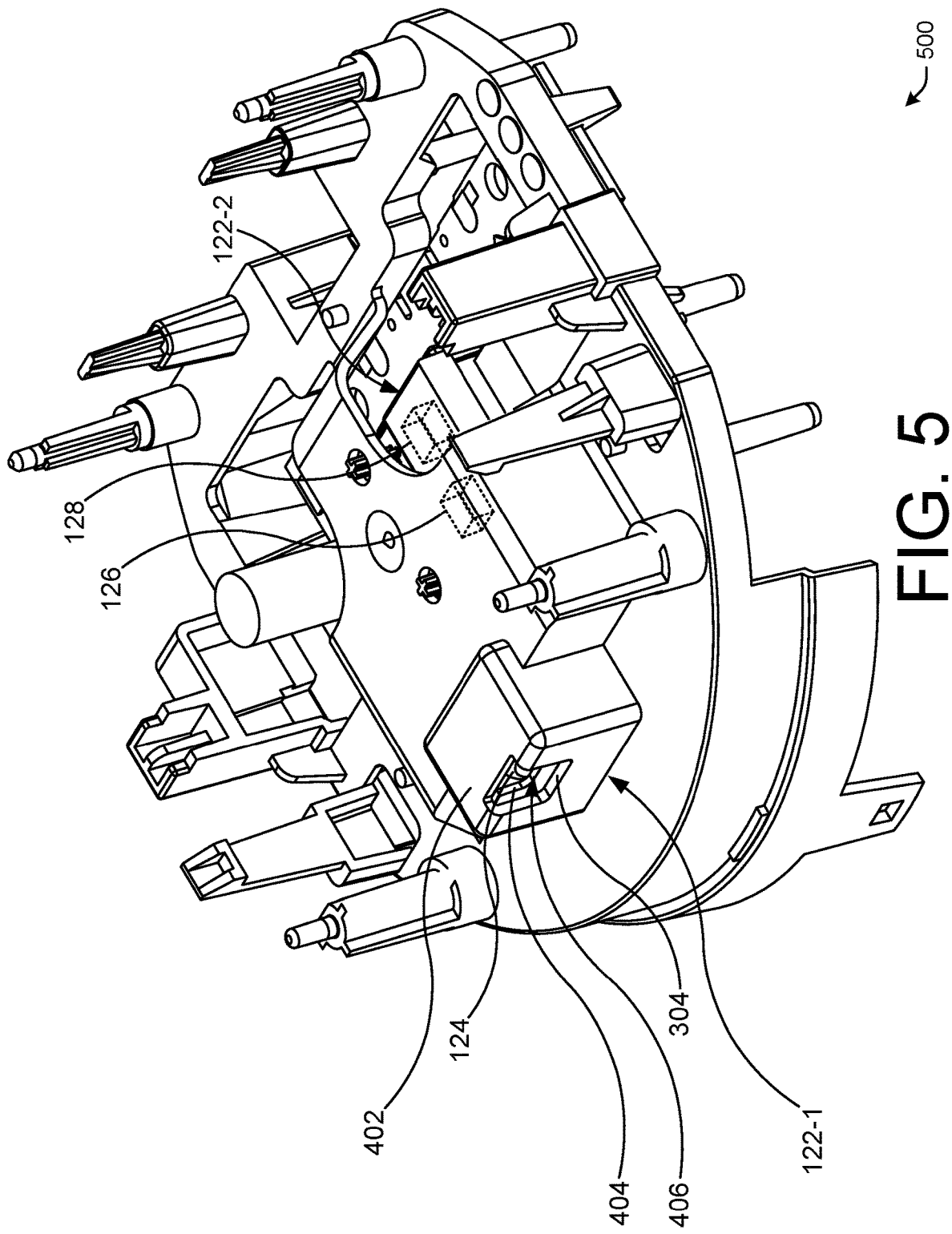
FIG. 5 illustrates a schematic diagram of the high-voltage protection module of FIG. 1, according to an example of the principles described herein.

The high-voltage protection module (e.g., circuitry) depicted in FIG. 2, along with the mechanical structures depicted and described in connection with FIGS. 3 through 6 allow for the utility meter to fail gracefully under HV surge events and abnormal overload conditions such as a sustained overvoltage condition that may occur on the power grid. Thus, turning now to FIGS. 3 through 5, FIGS. 3 through 5 illustrate a schematic diagram of the high-voltage protection module of FIG. 1, according to an example of the principles described herein. As depicted in FIGS. 3 through 5, various components of the utility meter (e.g., node 106-N) may be mechanically and/or electrically coupled to a printed circuit board (PCB) 306. For example, the fuse 128, the resistor 126, and the MOV 124 may be electrically coupled to the PCB 306.

Further, the node 106-N may include a first sub-housing 122-1 and a second sub-housing 122-2. First sub-housing 122-1 and second sub-housing 122-2 are referred to herein as sub-housings because the node 106-N may include a housing that encloses the components of the node 106-N including all the components depicted in FIGS. 2 through 6. However, the first sub-housing 122-1 and the second sub-housing 122-2 may also be referred to as housings in their own right. The first sub-housing 122-1 and the second sub-housing 122-2 may be made of any material including plastics. In one example, the first sub-housing 122-1 and the second sub-housing 122-2 may be made of a metal, metal alloy, a ceramic, or other material. In one example, the first sub-housing 122-1 and the second sub-housing 122-2 may be made of a fire resistant or fire retardant material.

The first sub-housing 122-1 may enclose the MOV 124 in order to physically isolate the MOV 124 from other components of the node 106-N. The MOV 124 is physically isolated to protect the remainder of the components of the node 106-N in instances where the MOV 124 is subjected to an HV surge event such as a sustained overvoltage condition that may result in chemical ejection from the MOV 124 (e.g., ejection of ionized plasma that may damage surrounding components of the utility meter). More regarding the manner in which the chemical ejection of the MOV 124 may take place is described below.

The second sub-housing 122-2 may enclose the fuse 128 and the resistor 126 in order to isolate the fuse 128 and the resistor 126 in a manner similar to how the MOV 124 is isolated within the first sub-housing 122-1. In some instances of the HV surge events, the fuse 128 may open to provide overcurrent protection of the high-voltage protection module and stopping or interrupting the current. The fuse 128 and/or the resistor 126 may also, like the MOV 124, suffer from a chemical ejection instance, and, therefore, the sub-housing 122-2 also helps to protect the remainder of the components of the node 106-N.

Turning again to the first sub-housing 122-1, the first sub-housing 122-1 may include a bottom portion 302 to secure the MOV 124 to the PCB 306 and contain the MOV 124. In one example the bottom portion 302 encloses the MOV 124 on five sides leaving the MOV 124 open at the top as depicted in FIG. 3. The first sub-housing 122-1 may also include a top portion 402 that covers the MOV 124 on at least one side. As depicted in FIGS. 3 through 5, the top portion 402 may cover the bottom portion 302 and the MOV 124 on five sides of the bottom portion 302 and the MOV 124 such that the bottom portion 302 nests inside the top portion 402. In this manner, the bottom portion 302 and the top portion 402 enclose the MOV 124 on at least 6 sides of the MOV 124.

In one example, the bottom portion 302 may include a first notch 304 defined at a top of the bottom portion 302, and the top portion 402 may include a second notch 404 defined at a top of the top portion 402. As depicted in, for example, FIGS. 4 and 5, the first notch 304 and the second notch 404 line up with one another such that the MOV 124 is exposed via the first notch 304 and the second notch 404 via an aperture 406 defined by the first notch 304 and the second notch 404. The aperture 406 (defined by the first notch 304 and the second notch 404) is located on a side of the bottom portion 302 and the top portion 402 that is opposite a side of the first sub-housing 122-1 that includes at least one component of the node 106-N including the fuse 128, the resistor 126, the PCB 306 and other electrical components coupled thereto, and other components of the node 106-N. The aperture 406 creates a pathway from which chemical ejections from the MOV 124 may be expelled away from these components in order to ensure that the node 106-N may gracefully fail without causing additional damage to the remainder of the node 106-N including its components and without causing damage to the structure such as a residence or commercial property to which the node 106-N is coupled. In other words, in instances where an HV surge event or abnormal overload condition (e.g., an overvoltage condition) is present and the MOV 124 physically breaks down and begins a chemical ejection, those dangerous chemicals including ionized plasma may be ejected out of the first sub-housing 122-1 via the aperture 406 and away from susceptible components of the node 106-N.

With reference to FIGS. 2 through 5, in one example, the high-voltage protection module may include a plurality of MOVs 124, fuses 128, and resistors 126 within the circuit depicted in FIG. 2 and corresponding layouts in FIGS. 3 through 5. In this example, a first MOV 124 may be electrically coupled to a first fuse 128 and a first resistor 126 in series, and separately, a second MOV 124 may be electrically coupled to a second fuse 128 and a second resistor 126 in series separate. This creates two separate protection circuits that are electrically coupled to the mains power. In one example, a first MOV and a second MOV may be coupled to the same fuse 128 and resistor 126 with each of the first MOV and second MOV being in series with the fuse 128 and resistor 126.

In these examples of multiple MOVs 124 and/or fuses 128 and resistors 126, the first sub-housing 122-1 may be configured to contain two separate MOVs and the aperture 406 defined in the bottom portion 302 and the top portion 402 may include two or more apertures 406. The two or more apertures may be formed on separate sides adjacent to the side the aperture 406 is formed as depicted in FIGS. 3 through 5. Any chemical ejections emitted via the apertures in this example may be ejected at those adjacent sides. In another example, two separate apertures may be formed on the same side as the side the aperture 406 is formed as depicted in FIGS. 3 through 5. Further, in the above examples of multiple MOVs 124 and/or fuses 128 and resistors 126, the multiple fuses 128 and resistors 126 may be contained within the same or a different second sub-housing 122-2.

With the circuit depicted in FIG. 2, the MOV 124 provides for a clamping voltage that serves to protect the utility meter and its various electrical components from damage by clamping any incoming HV surge or other abnormal overload condition fuse 128 and resistor 126. Further, the fuse 128 and resistor 126 allow for interruption of sustained overload and/or overvoltage instances while providing effective current through which PLC communications may be possible via the PLC communications frontend 130 and the PLC transceiver 110. Still further, the first sub-housing 122-1 provides for containment and control of chemical ejections from the MOV 124, and thus, prevent the node 106-N (e.g., utility meter) from catastrophic failure.

Figure 6:
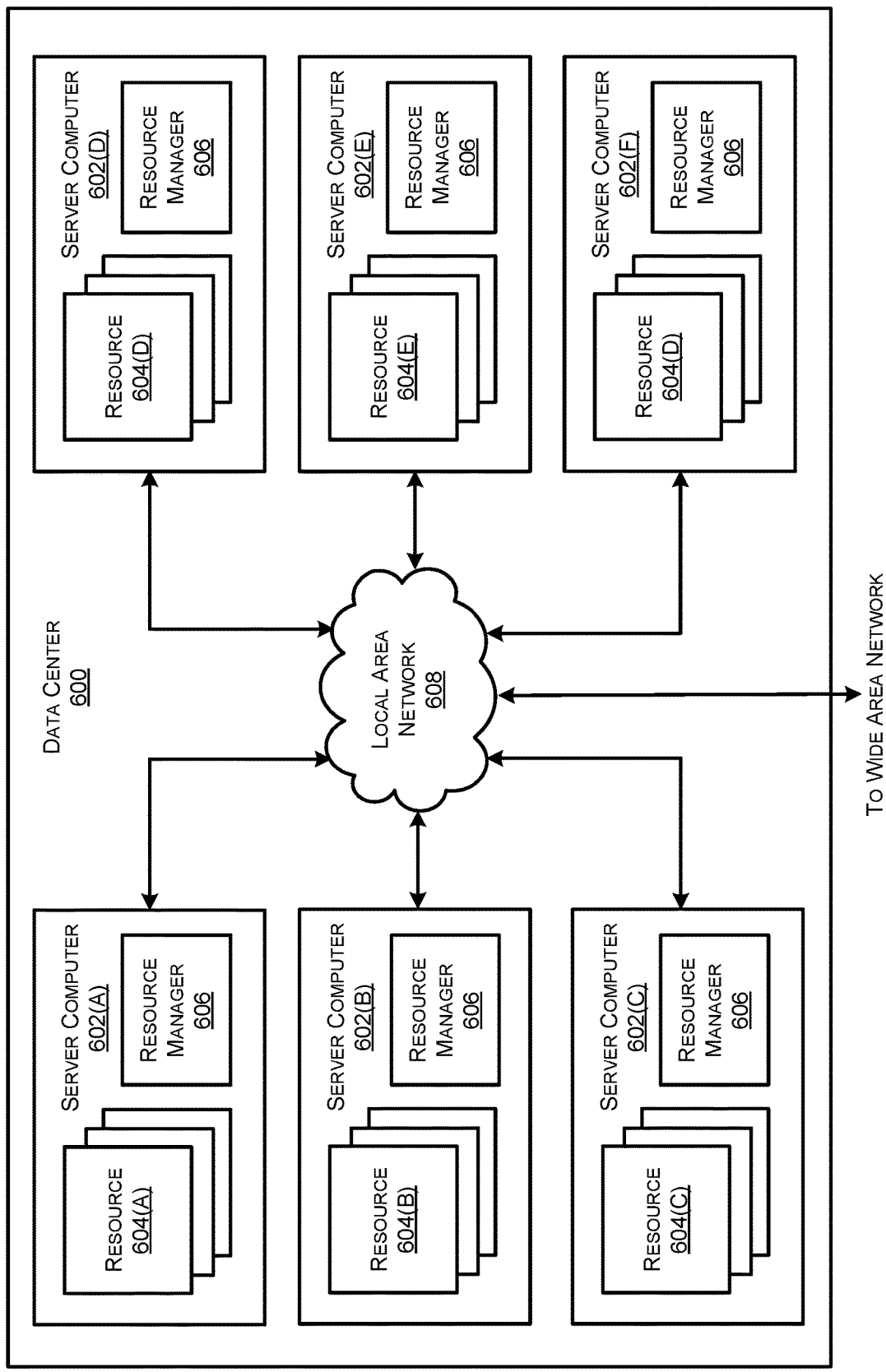
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, any type of networked device described herein including the nodes 106 and any computing device associated with the central office 102. Although described as servers, the server computers 602 may comprise any type of networked device, such as servers, switches, routers, hubs, bridges, gateways, modems, repeaters, access points, utility meters, workstations, desktop computers, laptop computers, tablet computing devices, network appliances, e-readers, smartphones, or other computing device etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606A-606F capable of instantiating and/or managing the computing resources. In the case of VM instances, for example, the resource manager 606A-606F may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600"). The data centers 600 are facilities utilized to house and operate computer systems and associated components. The data centers 600 may include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
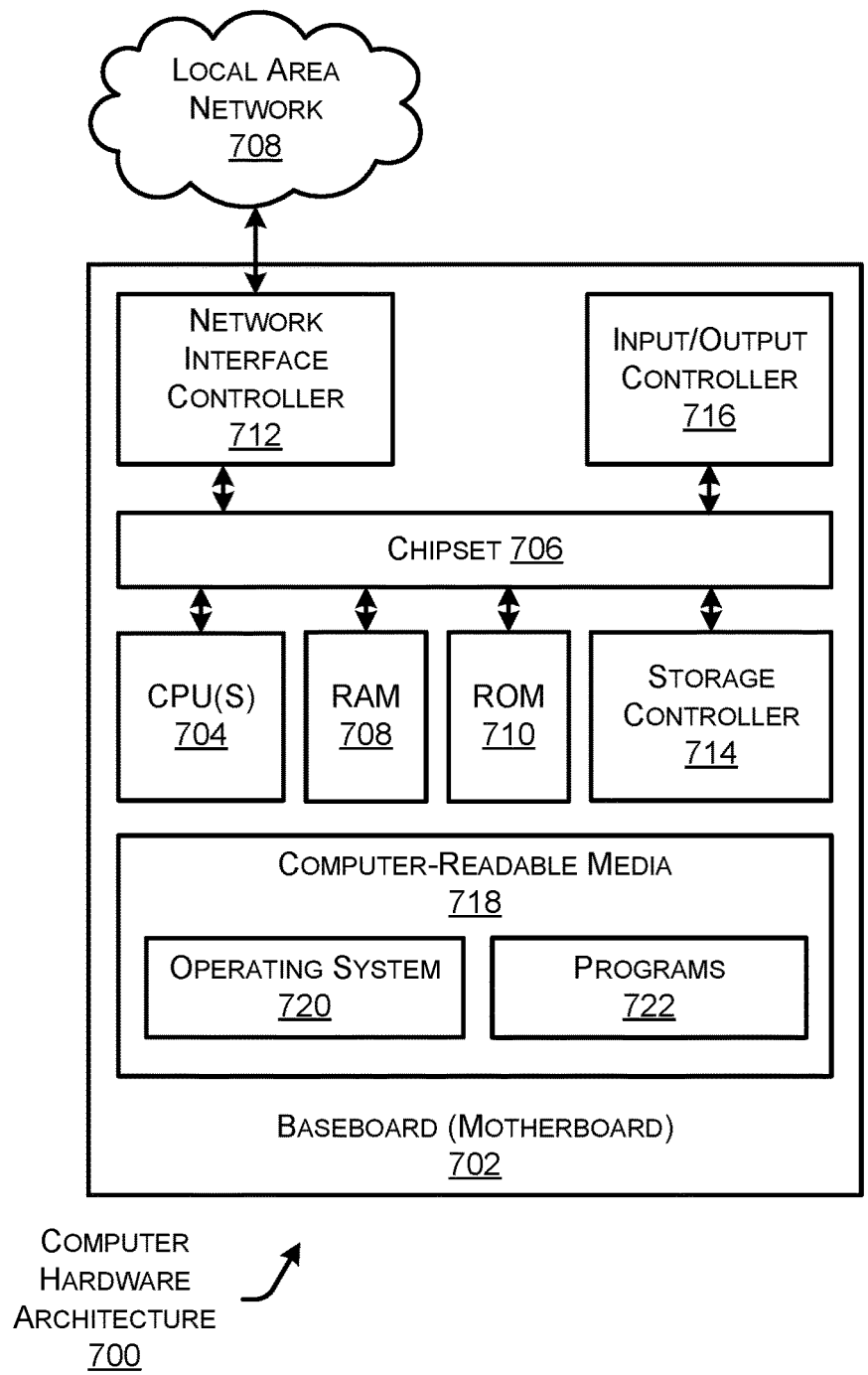
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer 700 that may be utilized to implement aspects of the various technologies presented herein. The computer 700 shown in FIG. 7 illustrates the nodes 106, computing devices located at the central office 102, and/or other systems or devices associated with the nodes 106 and/or remote from the nodes 106, a utility meter, a workstation, a desktop computer, a laptop, a tablet, a network appliance, an e-reader, a smartphone, or other computing device, and may be utilized to execute any of the software and/or hardware components presented herein. The computer 700 may, in some examples, correspond to a network device (e.g., the nodes 106) described herein, and may include networked devices such as servers, switches, routers, hubs, bridges, gateways, modems, repeaters, access points, etc.

The computer 700 includes a baseboard 702, or "motherboard," which is a printed circuit board (e.g., the PCB 306 of FIG. 3) to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the nodes 106, the network 104, and the central office 102. The chipset 706 may include functionality for providing network connectivity through a Network Interface Controller (NIC) 712, such as a gigabit Ethernet adapter. The NIC 712 is capable of connecting the computer 700 to other computing devices within the network architecture 100 and external to the network architecture 100. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722, and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the nodes 106 and or any components included therein, may be supported by one or more devices similar to computer 700. Stated otherwise, some or all of the operations performed by the node 106, and or any components included therein, may be performed by one or more computer devices operating in a cloud-based arrangement.

By way of example, and not limitation, computer-readable storage media may include volatile and non-volatile, removable, and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 includes the LINUX operating system. According to another example, the operating system includes the WINDOWS® SERVER operating system from MICROSOFT Corporation of Redmond, Washington. According to further examples, the operating system may include the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1-6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may include one or more of the nodes 106, computing devices located at the central office 102, and/or other systems or devices associated with the nodes 106 and/or remote from the nodes 106, and/or other systems or devices associated with the nodes 106 and/or remote from the nodes 106. The computer 700 may include one or more hardware processor(s) such as the CPUs 704 configured to execute one or more stored instructions. The CPUs 704 may include one or more cores. Further, the computer 700 may include one or more network interfaces configured to provide communications between the computer 700 and other devices, such as the communications described herein as being performed by the nodes 106, computing devices located at the central office 102, and/or other systems or devices associated with the nodes 106 and/or remote from the nodes 106, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may include any type of programs or processes to perform the techniques described in this disclosure for a node 106 as described herein. The programs 722 may enable the devices described herein to perform various operations.

CONCLUSION

The invention makes it possible for electric meters to fail gracefully in the event of an abnormal overvoltage or overcurrent scenario faced during on-field deployment. With the circuit depicted in FIG. 2, the MOV 124 provides for a clamping voltage that serves to protect the utility meter and its various electrical components from damage by clamping any incoming HV surge or other abnormal overload condition. Further, the fuse 128 and resistor 126 allow for interruption of sustained overload and/or overvoltage instances while providing effective current through which PLC communications may be possible via the PLC communications frontend 130 and the PLC transceiver 110. Still further, the first sub-housing 122-1 provides for containment and control of chemical ejections from the MOV 124, and thus, prevent the node 106-N (e.g., utility meter) from catastrophic failure.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A high-voltage protection module for a metrology device, comprising:
   a metal-oxide varistor (MOV) coupled across a mains power line;
   a resistor electrically coupled to the MOV in series with the MOV;
   a fuse electrically coupled to the MOV and the resistor in series, the resistor being located between the fuse and the MOV; and
   a power line carrier (PLC) communication frontend electrically coupled in series with the fuse and the resistor, and in parallel with the MOV.

2. The high-voltage protection module of claim 1, wherein the PLC communication frontend comprises:
   a capacitor in series with the fuse and the resistor; and
   a diode to provide clamp protection for a PLC transceiver.

3. The high-voltage protection module of claim 1, further comprising:
   a first housing configured to enclose the MOV, the first housing including:
      a base portion configured to enclose a first portion of the MOV; and a top portion configured to enclose a second portion of the MOV, the top portion comprising an aperture defined therein to vent outgassing.

4. The high-voltage protection module of claim 3, wherein the aperture defined in the top portion is defined in the top portion opposite a first side of the first housing relative to at least one component of the metrology device.

5. The high-voltage protection module of claim 4, further comprising a second housing, wherein:
the second housing is configured to enclose the fuse and the resistor, and
the second housing is located on a second side opposite the first side.

6. The high-voltage protection module of claim 3, wherein the aperture includes:
a first aperture defined in the top portion, the first aperture being configured to vent to a first side of the top portion; and
a second aperture defined in the top portion, the second aperture being configured to vent to a second side of the top portion opposite the first side.

7. The high-voltage protection module of claim 1, wherein the MOV includes:
a first MOV coupled to the resistor and the fuse in series; and
a second MOV coupled to the resistor and the fuse in series.

8. A metrology device comprising:
a high-voltage protection module including:
a metal-oxide varistor (MOV) coupled across a mains power line;
a resistor electrically coupled to the MOV in series;
a fuse electrically coupled to the MOV and the resistor in series; and
a power line carrier (PLC) communication frontend electrically coupled in series with the fuse and the resistor, and in parallel with the MOV.

9. The metrology device of claim 8, wherein the high-voltage protection module further comprises:
a first housing configured to enclose the MOV, the first housing including:
a base portion configured to enclose a first portion of the MOV; and
a top portion configured to enclose a second portion of the MOV, the top portion comprising an aperture defined therein to vent outgassing,
wherein the aperture defined in the top portion is defined in the top portion opposite a first side of the first housing relative to at least one component of the metrology device.

10. The metrology device of claim 9, wherein the high-voltage protection module further comprises a second housing, wherein:
the second housing is configured to enclose the fuse and the resistor, and
the second housing is located on a second side opposite the first side.

11. The metrology device of claim 9, wherein:
the MOV includes:
a first MOV coupled to the resistor and the fuse in series; and
a second MOV coupled to the resistor and the fuse in series, wherein the aperture includes:
a first aperture defined in the top portion, the first aperture being configured to vent to a first side of the top portion; and
a second aperture defined in the top portion, the second aperture being configured to vent to a second side of the top portion opposite the first side.

12. The metrology device of claim 8, further comprising a PLC transceiver,
wherein the PLC communication frontend comprises:
a capacitor in series with the fuse and the resistor; and
a diode to provide clamp protection for the PLC transceiver.

13. A network, comprising:
a metrology device communicatively coupled within the network; and
a central office communicatively coupled to the metrology device at least in part over a power line,
wherein the metrology device includes:
a high-voltage protection module including:
a metal-oxide varistor (MOV) coupled across a mains power line;
a resistor electrically coupled to the MOV in series;
a fuse electrically coupled to the MOV and the resistor in series; and
a power line carrier (PLC) communication frontend electrically coupled in series with the fuse and the resistor, and in parallel with the MOV.

14. The network of claim 13, further comprising:
a power line carrier (PLC) transceiver,
wherein:
the metrology device further includes the PLC communication frontend electrically coupled in series with the fuse and the resistor, and in parallel with the MOV, and
the PLC communication frontend couples the mains power line to the PLC transceiver.

15. The network of claim 14, wherein the high-voltage protection module further includes:
a first housing, the first housing being configured to enclose the MOV, the first housing including:
a base portion to enclose a first portion of the MOV; and
a top portion to enclose a second portion of the MOV, the top portion comprising an aperture defined therein to vent outgassing,
wherein the aperture defined in the top portion is defined in the top portion opposite a first side of the first housing relative to at least one component of the metrology device; and
a second housing, wherein the second housing is configured to enclose the fuse and the resistor, the second housing being located on a second side opposite the first side.

16. The network of claim 15, wherein the PLC communication frontend includes:
a capacitor in series with the fuse and the resistor; and
a diode to provide clamp protection for the PLC transceiver.

17. The network of claim 16, wherein the MOV includes:
a first MOV coupled to the resistor and the fuse in series, and
a second MOV coupled to the resistor and the fuse in series.

18. The network of claim 15, wherein the aperture includes:
a first aperture defined in the top portion, the first aperture being configured to vent to a third side of the top portion; and a second aperture defined in the top portion, the second aperture being configured to vent to a fourth side of the top portion opposite the third side.

\* \* \* \* \*